United States Patent [19]

Kwon et al.

[11] Patent Number: 5,147,667
[45] Date of Patent: Sep. 15, 1992

[54] BEEF FLAVOR

[75] Inventors: Steven S. Kwon, New Milford, Conn.; Michael A. Marsico, Bronxville, N.Y.; Dharam V. Vadehra, New Milford, Conn.

[73] Assignee: Nestec S.A., Vevey, Switzerland

[21] Appl. No.: 675,435

[22] Filed: Mar. 26, 1991

[51] Int. Cl.$^5$ .............................................. A23L 1/231
[52] U.S. Cl. ..................................................... 426/56
[58] Field of Search ........................................ 426/56

[56] References Cited

U.S. PATENT DOCUMENTS 4,110,477  8/1978  Naruse et al. ........................ 426/46
4,432,977  2/1984  Reimerdes ............................ 426/56

FOREIGN PATENT DOCUMENTS 0223560  6/1987  European Pat. Off. .

OTHER PUBLICATIONS

Visser, "Contribution of enzymes for rennet, starter bacteria and milk to proteolysis and flavor development in Gouda cheese. 2. Development of bitterness and cheese flavor", Neth. Milk Dairy J., 31 (1977), pp. 188-209.

Frey, et al., "Peptidases and proteases of lactobacilli associated with cheese", Milchwissenschaft 41 (10), pp. 622-624 (1986).

Ardö, et al., "Accelerated Cheese Ripening with Heat Treated Cells of Lactobacillus helveticus and a Commercial Proteolytic Enzyme", Journal of Dairy Research (1988), 55, 239-245.

Bartels, et al., "Accelerated ripening of Gouda cheese. 1. Effect of heat-shocked thermophillic lactobacilli and streptococci on proteolysis and flavor development", Milchwissenschaft 42(2), pp. 83-88 (1987).

Bartels, et al., "Accelerated ripening of Gouda cheese. 2. Effect of freeze-shocked Lactobacillus helveticus on proteolysis and flavor development", Milchwissenschaft 42(3), pp. 139-144 (1987).

Primary Examiner—Joseph Golian
Attorney, Agent, or Firm—Vogt & O'Donnell

[57] ABSTRACT

A culture of lactobacilli is added to and heated with a protease hydrolyzed beef juice concentrate at a temperature of from 50° C. to 60° C. to hydrolyse polypeptides contained in the protease hydrolyzed concentrate to enhance the flavor of the concentrate.

12 Claims, No Drawings

BEEF FLAVOR

BACKGROUND OF THE INVENTION

The present invention relates to a process for enhancing the flavor of a natural beef juice or beef stock.

European Patent Application Publication No. 223560 describes a method for flavor control of a protein hydrolysate which comprises selecting a proteinaceous feedstock, subjecting said feedstock to a primary enzymatic hydrolysis with a proteinase to produce a primary hydrolysate including bittering substances characterised by subjecting said primary hydrolysate to a secondary enzymatic hydrolysis with an extract containing aminopeptidase enzymes, said secondary enzymatic hydrolysis acting to convert said bittering substances to, at least, flavor-neutral substances.

SUMMARY OF THE INVENTION

We have found that by using a natural food such as beef juice as the substrate, rather than a more purified selected proteinaceous feedstock, and a culture of a food-grade microorganism which is capable of producing aminopeptidases, instead of an extract containing aminopeptidases, we can obtain a flavor having at least five times the intensity of a normal beef flavour.

Accordingly, the present invention provides a method for enhancing the flavor of a natural beef juice concentrate which comprises hydrolysing a beef juice concentrate with a protease and incubating the hydrolysed beef juice concentrate with a culture of a food-grade microorganism which is capable of producing aminopeptidases.

Preferably, the hydrolysis with a protease is carried out before the incubation step.

The beef juice concentrate may be any kind of concentrated beef juice, for example, beef stock.

DETAILED DESCRIPTION OF THE INVENTION

Any protease may be employed in the process of this invention, for example, acid protease, fungal protease, AlCALASE, Neutrase, Bromelain, or trypsin. The amount of protease used may be from 0.6 to 48 Anson Unit (AU)/kg and preferably from 2.4 to 24 AU/kg based on the weight The Ph of beef juice concentrate. The pH of the protease treatment may be from 3 to 11 and preferably from 4.0 to 9.0. The temperature of the protease treatment may be from 50° to 60° C. and preferably from 52.5° to 57.5° C.

The duration of the treatment with the protease may vary widely depending, for example, on the particular protease used, the concentration of the protease and the temperature. Preferably the duration is from 30 minutes to 5 hours, especially from 1.5 to 2.5 hours.

If desired, the hydrolysed beef juice may be pasteurised before cooling.

The food-grade microorganism may be selected from, for instance, yeasts, molds, bacteria such as *streptococci, bacilli* or *lacto bacilli*, preferably *Lactobacillus helveticus*. The food-grade microorganism may produce intracellular peptidases which may be secreted or may not be secreted in any substantial amount across the cell membrane. When the peptidases remain intracellular, it is thought that bitter tasting polypeptides permeate into the cells where they are hydrolysed by the peptidases to give debittered substances which are permeated back out of the cells into the slurry.

The peptidases produced by the food-grade microorganism are usually dipeptidase, tripeptidase, aminopeptidase and carboxypeptidase.

Advantageously, the food-grade microorganism may be heat-shocked before incubation, e.g., treated at 55°–70° C. for up to a few minutes to render the cell walls porous and to reduce their ability to produce acids from free sugar.

The cell concentration of the food-grade microorganism is conveniently from $10^3$ to $10^{10}$ cells/g and preferably from $10^4$ to $10^8$ cells/g.

The incubation temperature is conveniently from 40° to 60° C. and preferably from 50° to 57.5° C. The duration of the incubation is suitably from 2 to 30 hours, preferably from 3 to 24 hours and especially from 4 to 16 hours.

The pH during the incubation may be from 4 to 7.5 and preferably from 5.5 to 7.2, the optimal pH depending upon the nature of the substrate. Reduction of the pH may be obtained by employing food-grade acids, e.g., lactic or malic acid.

The incubation may be carried out without agitation but preferably with agitation, for example stirring from 50 to 300 rpm.

After incubation, the debittered protein may be pasteurised, e.g., at a temperature from 65° C. to 90° C. over a period of from 10 to 30 minutes, preferably with agitation or by high temperature short time treatment, followed by cooling.

The final beef flavored product may be dried and, as such, can be stored at room temperature. If the final product is in the liquid form, it should be stored under frozen or refrigerated conditions depending on the length of storage desired.

EXAMPLE

The following Example further illustrates the present invention.

EXAMPLE 100 parts of beef juice concentrate containing 40% solids was heated to 55° C. and the pH adjusted to 7.0 with 20% KOH. 0.5 parts of ALCALASE 2.4 L (a protease obtained from Novo) were added and the mixture hydrolysed at 55° C. for 2 hours while maintaining the pH at 7.0 with 20% KOH. The hydrolysate was pasteurised at 90° C. for 20 minutes and cooled to 30°–35° C.

The pH of the hydrolysate was then adjusted to 6.0 with 20% malic acid and 3% of washed *lactobacillus helveticus* culture (Miles Laboratories) were added and incubated at 55° C. for 12 hours. The pH was readjusted to 6.5–6.8 with 20% KOH and the product was pasteurised at 80° C. for 15 minutes.

The flavor produced had at least five times the intensity of normal roast beef flavour as determined by the concentration of free amino acids generated by the treatments as shown in the Table below.

TABLE

| Treatment | Free Amino Acid Concentration (FAA)* | flavor Intensity Increase Potential |
| --- | --- | --- |
| Beef juice concentrate | 2.15 mg/ml | Control |
| After proteolysis | 4.94 mg/ml | 2.29× |

TABLE-continued

| Treatment | Free Amino Acid Concentration (FAA)* | flavor Intensity Increase Potential |
|---|---|---|
| After debittering | 13.72 mg/ml | 6.39× |

*FAA expressed as tyrosine equivalent

We claim:

1. A process for enhancing the flavor of a beef juice comprising adding a protease and a culture of lactobacilli to a concentrated beef juice and heating the concentrate containing the protease and lactobacilli culture at a temperature of from 50° C. to 60° C. for obtaining a hydrolysed flavor enhanced concentrate.

2. A process for enhancing the flavor of a beef juice comprising adding a protease to a beef juice concentrate and hydrolysing the concentrate with the protease, adding a culture of lactobacilli to the protease hydrolysed concentrate and heating the hydrolysed concentrate and culture at a temperature of from 50° C. to 60° C. to hydrolyse polypeptides contained in the hydrolysed concentrate to obtain a flavor enhanced concentrate.

3. A process according to claim 1 or 2 wherein the lactobacilli is *Lactobacillus helveticus*.

4. A process according to claim 1 or 2 further comprising heat-shocking the lactobacilli prior to adding the lactobacilli culture to the concentrate.

5. A process according to claim 1 or 2 wherein the protease is added to the concentrate in an amount of from 0.6 to 48 Anson units/kg based on the weight of the beef juice concentrate and the lactobacilli culture has a concentration of from $10^3$ cells/g to $10^8$ cells/g culture.

6. A process according to claim 1 or 2 wherein the heated concentrate is maintained at a pH of from 4 to 7.5 during heating and is heated for from 2 hours to 5 hours.

7. A process according to claim 1 or 2 further comprising pasteurizing the flavor enhanced concentrate.

8. A process according to claim 1 wherein the lactobacilli is Lactobacillus helveticus and has a concentration of from $10^3$ to $10^{10}$ cells/g culture and further comprising heat-shocking the lactobacilli prior to adding the lactobacilli culture to the protease hydrolysed concentrate.

9. A process according to claim 2 or 8 wherein the beef juice concentrate is hydrolysed with the protease in an amount of from 0.6 to 48 Anson units/kg based on the weight of the beef juice concentrate at a pH of from 4.0 to 9.0 and at a temperature of from 50° C. to 60° C. and wherein the protease hydrolysed concentrate and lactobacilli culture are maintained at a pH of from 4 to 7.5 during heating and are heated for from 2 hours to 30 hours.

10. A process according to claim 2 or 8 further comprising pasteurizing the flavor enhanced concentrate.

11. A process according to claim 2 further comprising pasteurizing the protease hydrolysed concentrate prior to adding the lactobacilli culture and further comprising pasteurizing the flavor enhanced concentrate.

12. A process for treating a beef juice comprising heating a protease hydrolysed beef juice concentrate with a lactobacilli at a temperature of from 50° C. to 60° C. for hydrolysing polypeptides contained in the protease hydrolysed concentrate.

UNITED STATES PATENT AND TRADEMARK OFFICE
CERTIFICATE OF CORRECTION

PATENT NO. : 5,147,667
DATED : September 15, 1992
INVENTOR(S) : Steven S. Kwon, et. al.

It is certified that error appears in the above-indentified patent and that said Letters Patent is hereby corrected as shown below:

On the Title page, item [56], under the heading "References Cited OTHER PUBLICATIONS", in the title of the Visser reference, "for" should be --from--.

Column 1, line 47, after "weight", insert --of beef juice concentrate--.

Column 1, line 48, delete "The Ph of beef juice concentrate"--.

Column 4, line 9, (line 1 of claim 8), "1" should be --2--.

Column 4, line 10, linde 2 of claim 8, "Lactobacillus helveticus" should be italicized--.

Signed and Sealed this

Seventh Day of September, 1993

Attest:

BRUCE LEHMAN

*Attesting Officer*  *Commissioner of Patents and Trademarks*